United States Patent [19]

Gould et al.

[11] Patent Number: 4,997,488

[45] Date of Patent: Mar. 5, 1991

[54] COMBINED PHYSICAL AND CHEMICAL TREATMENT TO IMPROVE LIGNOCELLULOSE DIGESTIBILITY

[75] Inventors: John M. Gould, Brimfield; Brian K. Jasberg, Peoria, both of Ill.

[73] Assignee: The United States of America as represented by the Secretary of Agriculture, Washington, D.C.

[21] Appl. No.: 434,631

[22] Filed: Nov. 14, 1989

[63] Continuation of Ser. No. 152,791, Feb. 5, 1988, now abandoned.

[51] Int. Cl.$^5$ ............................ C13K 1/02; C12P 7/10; D21C 3/00; D01C 1/00
[52] U.S. Cl. ............................................ 127/37; 536/56; 536/57; 162/18; 162/78; 162/96; 162/97; 162/98; 162/99; 426/636; 426/807; 426/635; 426/254; 426/258; 426/615; 426/623; 426/626; 530/500
[58] Field of Search ............... 536/56, 57; 127/37; 162/18, 78, 96, 97, 98, 99; 426/254, 256, 258, 261, 615–618, 623, 626, 629–636, 640, 807; 530/500; 435/165

[56] References Cited

U.S. PATENT DOCUMENTS 2,487,114  11/1949  Dreyfus .................................. 92/13
4,214,947   7/1980  Berger ................................... 162/18
4,649,113   3/1987  Gould ................................... 435/165
4,661,205   4/1987  Ow et al. .............................. 162/78

OTHER PUBLICATIONS

J. M. Gould, "Studies on the Mechanism of Alkaline Peroxide Delignification of Agricultural Residues," Biotechnol. Bioeng. XXVII: 225–231 (1985) (#5530).
M. E. Carr et al., "Modification of Wheat Straw in a High-Shear Mixer," Biotechnol. Bioeng. XXVI: 1252–1257 (1984) (#5444).

Primary Examiner—Chung K. Pak
Attorney, Agent, or Firm—M. Howard Silverstein; John D. Fado; Curtis P. Ribando

[57] ABSTRACT

A synergistic combination of high-shear mechanical disruption and alkali pretreatment in a high solids reaction mixture constitutes a significant improvement in the alkaline peroxide treatment of lignocellulosic materials. The simultaneous application of these conditions greatly reduces the amounts of reagents otherwise required, and also eliminates the waste stream of liquid byproducts. Suitable sources of substrate treatable by this process include nonwoody plant parts, crop residues, and agricultural byproducts. The products of this treatment are nontoxic and characterized by high cellulose availability. These products are thereby useful as carbohydrate sources in ruminant feeds, as microbial feedstocks, and as sources of dietary fiber for humans and other monogastrics.

4 Claims, No Drawings

4,997,488

COMBINED PHYSICAL AND CHEMICAL TREATMENT TO IMPROVE LIGNOCELLULOSE DIGESTIBILITY

This application is a continuation of application Ser. No. 07/152,791, filed Feb. 5, 1988, now abandoned.

BACKGROUND OF THE INVENTION

1. Field of the Invention

Renewable lignocellulosic biomass is readily available from abundant, inexpensive argicultural residues such as corn stover and straw. Utilization of this material as a carbohydrate source for glucose and ethanol production, and as a metabolic energy source in ruminant feeds, has been severly hampered by the low efficiency with which organisms and enzymes are able to convert the polysaccharide portion of the residue into monomeric sugars. The low conversion efficiency for lignocellulosic materials is the result of two principal factors: (1) unavailability of the cellulose and hemicellulose resulting from the close physical and chemical associations between lignin and these polysaccharides in the plant cell wall, and (2) the degree of crystallinity within the cellulose polymer itself.

Lignin is thought to prevent the degradation of cellulose mainly by acting as a physical barrier between the cellulolytic enzyme and its substrate. Consequently, the rate and extent of enzymatic cellulose degradation in lignocellulosic materials is inversely related to the lignin content, with maxiumum degradation occurring only after 50% or more of the lignin has been removed. Even when lignin levels are low, however, the hydrolysis of cellulose can be limited by the physical properties of the polysaccharide itself. Amorphous regions of cellulose are hydrolyzed at much higher rates than are micro-crystalline regions, for example.

This invention relates to a pretreatment process for rendering the polysaccharide components of lignocellulosic residues available for use in biological systems as sources of carbohydrate.

2. Description of the Prior Art

Numerous pretreatments have been developed in an effort to increase the efficiency of enzymatic saccharification. These processes utilize physical, chemical, and/or biological methods to remove lignin and decrease cellulose crystallinity. Although most of these pretreatments do result in increased cellulose hydrolysis, the yields of glucose obtained are usually still well below theoretical levels. Moreover, processes such as autohydrolysis, alkaline cooking, and steam explosion require substantial energy input in the form of heat and tend to generate toxic side products. A few pretreatments have been developed that allow essentially quantitative conversion of cellulose into glucose, but these processes involve the use of expensive, hightly toxic reagents such as cadoxen, ethylenediamine, or peracetic acid. Toxic constituents in the digest, of course, interfere with subsequent biological saccharification and fermentation steps, and also prohibit use of the digest as an animal feed. Other drawbacks typical of conventional pretreatments include loss of the hemicellulose with the solubilized fraction and also reversion of the cellulose crystallinity upon drying. For example, Dreyfus (U.S. Pat. No. 2,487,114) obtains a product high in alpha-cellulose content and low in hemicellulose by treating straw with hydrogen peroxide in highly alkaline aqueous solution.

The first process to be disclosed in the literature for successfully converting nonwoody lignocellulosic materials into highly digestible products having nearly complete availability of the cellulosic components is that of Gould (U.S. Pat. No. 4,649,113). Gould utilizes a batch process for converting agricultural corp residues to useful carbohydrate sources for ruminants and microbes by treatment with alkaline peroxide. The treatment is under conditions of controlled pH which are designed to conserve the hemicellulose in the recovered carbohydrate fraction; but the process requires relatively large amount of chemical reagents and water, and it generates a stream of liquid waste. Carr et al [Biotechnol. Bioeng. 26: 1252–1257 (Oct. 1984)] treated wheat straw with a variety of chemicals by a continuous process in an extrusion cooker, but found that alkaline peroxide effected essentially no increase in cellulose digestibility when straw at 20% concentration was treated at 97° C. for 5.5 minutes with NaOH (4%, dry straw basis) and $H_2O_2$ (2%, dry straw basis).

SUMMARY OF THE INVENTION

We have unexpectedly discovered a synergistic effect at high solids concentrations between high-shear mechanical disruption and alkali pretreatment that greatly reduces the amounts of alkali and peroxide required to achieve highly digestible lignocellulosics, compared to the Gould process. This is especially surprising in view of the previous finding that higher solids concentrations in the treatment of straw inhibit the incorporation of oxygen from $H_2O_2$ into lignin [Gould, Biotechnol. Bioeng. 27: 225–231 (Mar. 1985)]. A secondary benefit of treatment at high solids concentration is the elimination of a liquid waste stream, thereby simplifying the recovery process and avoiding the loss of any solubilized carbohydrate fractions.

In accordance with this discovery, it is an object of the invention to provide an improved delingnification process which permits the efficient utilization of agricultural residues.

It is also an object of the invention to maximize the availability of the polysaccharide constituents in a crop-residue delignification treatment.

Another object of the invention is to provide a non-toxic nutritional food source for ruminant animals.

A further object of the invention is to provide a microbial feedstock useful in the production of alcohol and other beneficial products.

Other objects and advantages of the invention will become readily apparent from the ensuing description.

DETAILED DESCRIPTION OF THE INVENTION

The term "available" and its derivatives as used herein in reference to the terms "cellulose," "hemicellulose," and "polusaccharides" are defined as meaning "free" in the sense that these components of the substrate are accessible for enzymatic hydrolysis to monosaccharides under normal conditions and/or readily digestible by ruminant animals without prior modification. The term "woody" is used herein both in the botanical sense to mean "comprising wood"; that is, composed of extensive xylem tissue as found in trees and shrubs, and also in the sense of "being woodlike." Accordingly, "nonwoody" refers to materials lacking these characteristics.

Sources of lignocellulosic substrates which can be advantageously treated by the process of the invention include the leaves and stalks of nonwoody plants, particularly monocotyledonous plants, and especially grassy species belonging to the family Gramineae. Of primary interest are gramineous agricultural residues; that is, the portions of grain-bearing grassy plants which remain after harvesting the seed. Illustrative of such residues without limitation thereto are wheat straw, oat straw, rice straw, barley straw, rye straw, buckwheat straw, flax straw, corn stalks, corn cobs, corn husks, and the like. The process is also highly effective when applied to certain grasses not conventionally cultivated for agricultural purposes, such a prairie grasses, gamagrass, and foxtail.

Other sources of suitable substrates are agricultural byproducts including fruits, roots, tubers and components thereof. The terms "fruits," "roots," and "tubers" are used herein in the botanical sense. Thus, "fruit" is defined as the ripened plant ovary (or group of ovaries) containing the seeds, together with any adjacent parts that may be fused with it at maturity. It is intended that the term "fruit" include simple dry fruits (follicles, legumes, capsules, achenes, grains, samaras, and nuts), simple fleshy fruits (berries, drupes, false berries, and pomes), aggregate fruits, and multiple fruits, as botanically defined. For the purpose herein, the term "fruits" is also intended to include any residual or modified leaf and flower parts which may contain or be attached to the true fruit, such as a bract. Encompassed within this definition of "fruit" are cereal grains and other seeds. Components of these materials contemplated for use herein include bran and certain seed hulls. "Bran" is a component of cereals and is defined as a fraction obtained during the processing of cereal grain seeds and consisting of the lignocellulosic seedcoat separated from the flour or meal. Examples of nonwoody seed hulls are the bracts of oats and rice. "Root" is defined as the usually underground portion of a plant body that functions as an organ of absorption, aeration, and food storage or as a means of anchorage and support, and differs from the stem especailly in lacking nodes, buds, and leaves. "Tuber" is defined as a much enlarged portion of a subterranian stem (stolon) provided with buds on the sides and tips.

The lignocellulosic substrates of principal interest in the category of agricultural byproducts are waste stream components from commercial processing of crop materials such as sugar beet pulp, citrus fruit pulp, nonwoody seed hulls, corn cobs, corn husks, and cereal bran. Unless otherwise specified, the terms "citrus pulp" or "citrus fruit pulp" will be used herein in the generic sense to define the waste product of the citrus juice industry. This product typically includes both the rind of the fruit and also the fleshy juice sacs. The fleshy material is oftentimes also referred to as "pulp," and it alone is a suitable substrate within the ambit of the invention.

The substrate may be treated directly as obtained from the field, or from the mill or processing plant, or it may optionally be subjected to one or more preparatory steps such as chopping or coarsely grinding to facilitate handling. In some cases, it may be necessary to clean the substrate by screening, washing, or the like in order to remove dirt, debris, and other undesirable matter.

The combined physical and alkali pretreatment of this invention is conducted in a high-shear mixer under conditions that result in substantially uniform distribution of the alkali reagent throughout the lignocellulosic substrate. The shear must be sufficient to achieve physical disruption and disintegration of the substrate tissue, thereby permitting permeation of the reagents into the lignocellulosic matrix. Use of an extruder in accordance with the preferred embodiment of the invention provides the requisite high-shear mixing including structural disintegration of the substrate. An extruder also allows for continuous processing. Enough water should be present in the substrate throughout the mixing operation to impart a sufficient degree of lubricity to the material such that it flows through the mixer without scorching. The solids content should not be less than about 30% by weight in order to obtain sufficient shear forces to achieve the requisite physical disruption and disintegration of the substrate.

The sodium hydroxide or other strong alkali in aqueous solution is the first of the chemical reagents added to the substrate. For optimum availability of carbohydrate, it is critical that the amount of alkali be sufficient to adjust the pH of the reaction mixture after peroxide addition to within the range of about 11.2 to about 11.8, and preferably as close to 11.5 as possible. Below pH 11.2, the delignification efficiency declines significantly. Above pH 11.8 delignification may be slightly improved, but the saccharification efficiency is adversely affected.

The degree of efficiency of delignification attainable by the process for a given substrate is limited to an intrinsic maximum, and at least in part is a function of the concentration of peroxide in the reaction mixture. Generally, the peroxide should be present in a ratio of peroxide to dry residue in the range of about 0.005–0.05 to 1 (w/w). The minimum amount of peroxide needed to achieve the maximum digestibility can be readily determined by the skilled artisan. Though hydrogen peroxide is preferred, others such as sodium peroxide may also be used.

To maximize the availability of the peroxide in the reaction mixture, the reaction conditions at the time of, and subsequent to, peroxide addition should be selected to minimize nonproductive decomposition of the peroxide. The expression "nonproductive decomposition" is used herein to refer to loss of peroxide by mechanisms other than those involved in the delignification process itself. Therefore, temperatures at the time of addition should be maintained below about 130° C., preferably below about 90° C.. Thus, once the substrate has been thoroughly wetted and permeated by the alkali by virture of the high shear mixing, then the peroxide can be uniformly incorporated into the slurry under less stringent conditions. For example, in a multistage extruder, the final stage can be adapted for comparatively low shear conveyance and reserved for introduction of the peroxide. Usually a relatively short period of mixing on the order of 5–30 seconds is sufficient to distribute the peroxide thoughout the wetted substrate.

Subsequent to addition of the peroxide, the treated lignocellulosic substrate is held under conditions which will promote its delignification. Preferably, this holding step is conducted at ambient temperatures for sufficient time to allow maximal increase in digestibility. This time will be variable, up to about 24 hours, depending on the levels of chemicals used and other reaction conditions existent in the mixer. The amount of water in the reaction mixture, including the water initially introduced with the substrate as well as that used as solvent for the reagents should be sufficient to provide a solids concentration in the range of about 30–60% by weight. At these levels, all the liquid portion of the reaction mixture remains absorbed by the solid materials. Because no liquid waste stream is generated by this process, recovery is usually limited to an optional drying step.

The alkaline peroxide-treated product of this invention is useful as a microbial feedstock without the need for detoxification or any other type of purification. The glucosidic saccharification product is likewise free of inhibitory side products which would tend to interfere with microbial growth, and is efficiently fermented to ethanol or the like by conventional methods in the art.

In like manner, the delignified residue of the instant process is remarkably adapted for use as a carbohydrate source in ruminant feeds without purification or further treatment. From 70–100% of the potentially digestibe matter is in fact disgestible by the ruminant animal. The product is suitably blended with other feed components needed for a balanced diet.

The following examples are intended only to further illustrate the invention and are not intended to limit the scope of the invention which is defined by the claims.

EXAMPLE 1

Wheat straw was prepared for high shear alkaline peroxide treatment in an extruder by grinding in a hammer mill to pass a 1.6-cm. screen. The extruder was an "Insta-Pro Model 2000-R" obtained from Insta-Pro Division, Triple F Feeds, Des Moines, Iowa. The extruder shaft in the treatment section consisted of three cast carbon steel 15.9-cm long flighted screw sections (13.3 cm diameter) separated by flight-interrupting steam-locks (13.7 cm diameter, 2.2 cm thick) that restricted flow and shredded the straw during extrusion. The shaft additionally included a feed screw section in the substrate input portion of the barrel. The extruder barrel consisted of four identical bolt-together cast carbon steel sections with threaded ports that were used for injecting the reagents. The inside diameter of the barrel was 13.5 cm except at the steam-locks, where the inside diameter was 14.2 cm. The end of the last screw section was terminated with a 14.0-cm diameter steam-lock. The rod die supplied with the extruder was replaced with an annular ring die (inside diameter 14.2 cm, depth 4.1 cm) that extended 2 cm beyond the last steam-lock. The ground straw was introduced into a 10-cm ×10-cm opening in the first barrel section by pouring through a funnel.

Both the NaOH and the $H_2O_2$ were injected simultaneously into the second section of the extruder by means of a calibrated dual-piston proportioning pump connected to the extruder barrel with stainless steel tubing and fittings. Concentrations of stock solutions were adjusted to achieve the desired rates of water and chemical application reported in Table I, below. Actual application rates were calculated from the amount of each chemical solution pumped during the treatment, the average rate of straw throughout, and the measured straw consistency (percent solids) determined from extruded samples. Transit time for straw in the extruder was about 60 seconds. The temperature of treated straw emerging from the extruder was typically about 80° C. or less. The extrudate had a shredded, masticated appearance and though moist, had no free water present. Some of the straw segments were still identifiable as such, although the structural integrity of the tissue had been largely destroyed, the straw segments being flattened and also torn lengthwise during the process. The data in Table I show that when $H_2O_2$ was injected into the second section of the extruder simultaneously with the NaOH, peroxide levels in the straw emerging from the extruder fell sharply as the reaction pH was increased above 11 and into the operable range of 11.2 –11.8 required for enhancing cellulose digestibility.

EXAMPLE 2

The procedure of Example 1 was repeated except that the $H_2O_2$ was injected into the last (fourth) section of the extruder just upstream from the die. Under these conditions, residence time of the $H_2O_2$ in the extruder barrel was less than 15 seconds, and the proportion of applied $H_2O_2$ surviving the extruder treatment improved considerably, as shown by the data in Table I.

EXAMPLE 3

After a passage through the extruder, the alkaline peroxide-treated straws of Example 2 were held for 24 hours at 25° C.. No residual $H_2O_2$ was detected in any of the treated straws at the end of the holding period. The treated straws were dried by heating at 60° C. for 24 hours and then assayed for ruminal digestibility in fistulated beef steers using the nylon bag technique [Kerley et al., Science 230: 820–822 (Nov. 15, 1985)]. The results are reported in Table II, below. The precent dry matter disppearance from the bag during the 24-hour ruminal incubation is assumed to represent the percentage of dry matter digestible by rumen microorganisms.

It is understood that the foregoing detailed description is given merely by way of illustration and that modification and variations may be made therein without departing from the spirit and scope of the invention.

TABLE I

| Example | $H_2O_2$ Addition | Application Rate[a] $H_2O_2$ | NaOH | Percent Solids | Final pH | Residual $H_2O_2$ Amount[a] | % of Applied |
|---|---|---|---|---|---|---|---|
| 1A | With NaOH | 2.64 | 1.32 | 38 | 10.9 | 2.31 | 87.5 |
| 1B |  | 2.35 | 1.57 | 39 | 11.2 | 0.60 | 25.6 |
| 1C |  | 2.42 | 2.01 | 39 | 11.4 | 0.39 | 16.1 |
| 1D |  | 2.58 | 3.01 | 40 | 11.7 | 0.27 | 10.5 |
| 2A | After NaOH | 2.45 | 2.04 | 40 | 11.1 | 1.94 | 79.2 |
| 2B |  | 2.49 | 2.33 | 38 | 11.4 | 1.71 | 68.7 |
| 2C |  | 2.21 | 2.59 | 45 | 11.5 | 0.74 | 33.5 |
| 2D |  | 2.63 | 2.05 | 39 | 11.6 | 0.62 | 23.6 |

[a]Grams per 100 grams dry straw.

TABLE II

| Example | Reaction pH | Dry Matter Disappearance, % |
|---|---|---|
| 3A | 11.1 | 72.7 |
| 3B | 11.4 | 76.2 |
| 3C | 11.5 | 74.1 |

TABLE II-continued

| Example | Reaction pH | Dry Matter Disappearance, % |
|---|---|---|
| 3D | 11.6 | 78.6 |

We claim:

1. A method for increasing the availability of a nonwoody lignocellulosic substrate comprising pretreating said substrate in the presence of water with strong alkali in combination with shear in an extruder sufficient to achieve physical disruption and disintegration of said substrate mixing the resultant pretreated substrate with peroxide to yield a reaction mixture having a solids content in the range of about 30–60% by weight, wherein the ratio of peroxide to substrate is in the range of 0.005–0.05:1 (w/w), and the amounts of alkali and peroxide are selected to provide in the reaction mixture a pH in the range of about 11.2 to about 11.8, holding the reaction mixture under conditions which minimize the nonproductive decomposition of the peroxide until reaction of the peroxide with the substrate is substantially complete, and recovering the entire reaction mixture as the product without the loss of solubilized carbohydrate fractions.

2. A method as described in claim 1 wherein the nonwoody lignocellulosic substrate is an agricultural residue.

3. A method as described in claim 1 wherein the nonwoody lignocellulosic substrate is an agricultral byproduct.

4. A method as described in claim 1 wherein the strong alkali is sodium hydroxide and the peroxide is hydrogen peroxide.

* * * * *